May 21, 1957 H. W. HOBDAY 2,792,651
FINISH LEVELER
Filed June 11, 1954 4 Sheets-Sheet 1
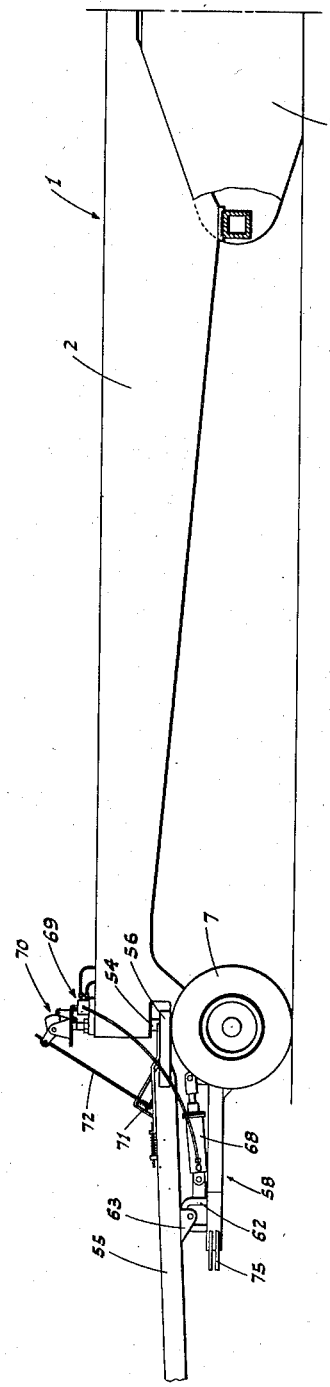
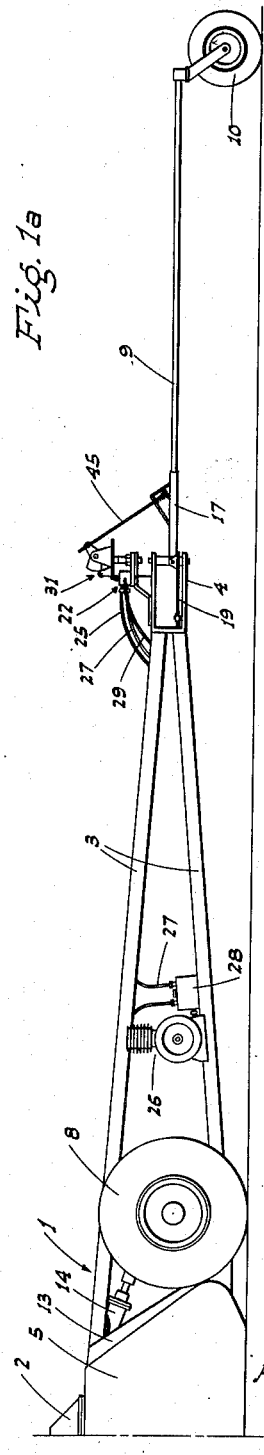
INVENTOR
Harold W. Hobday
ATTORNEYS

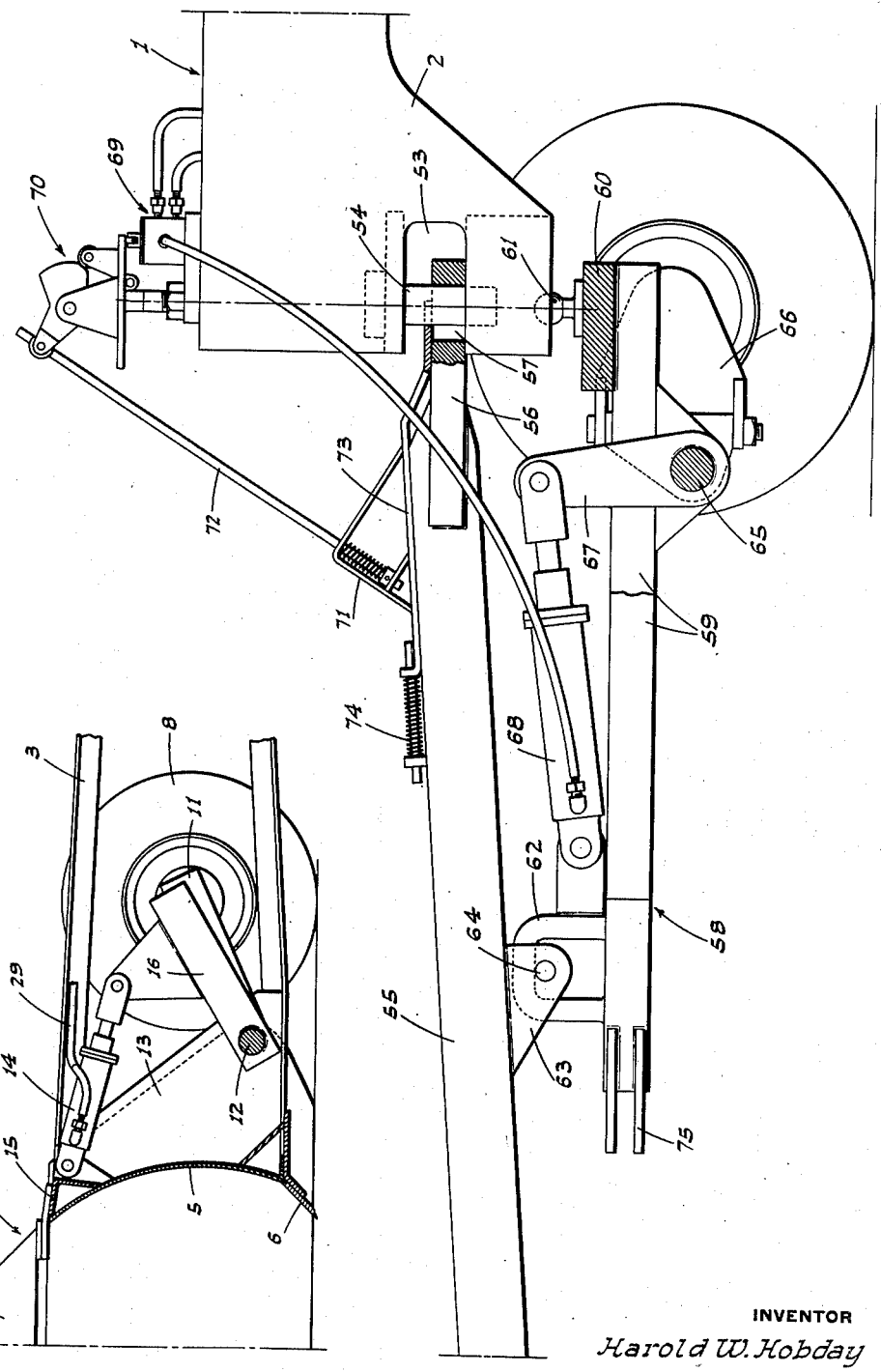

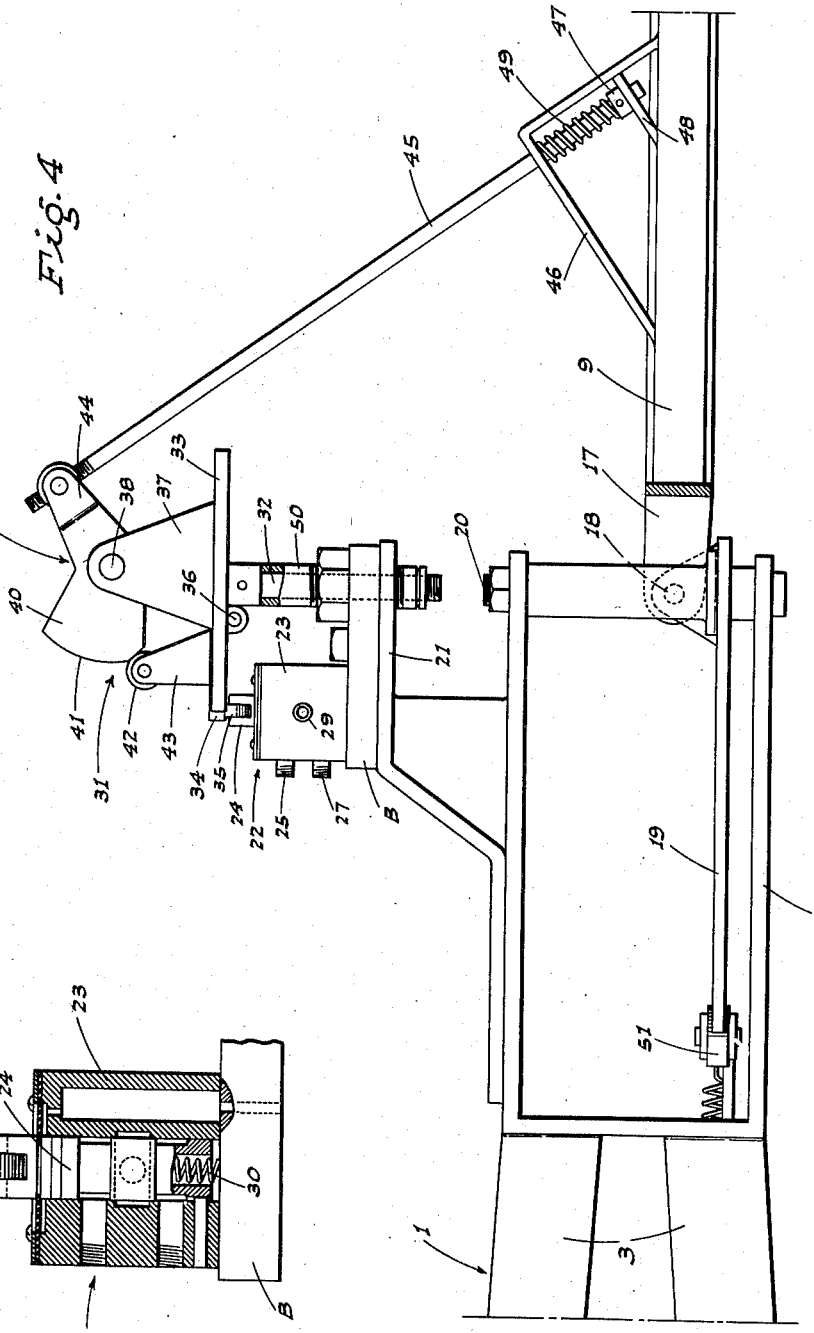

United States Patent Office 2,792,651
Patented May 21, 1957

2,792,651

FINISH LEVELER

Harold W. Hobday, Galt, Calif., assignor to Gurries Manufacturing Co., San Jose, Calif., a corporation of California Application June 11, 1954, Serial No. 436,130

11 Claims. (Cl. 37—180)

This invention relates to finish levelers of the type which includes an elongated frame carried on wheels at its ends and provided intermediate its ends with a scraper blade for leveling the ground—preparatory to crop planting—as the implement is drawn over the ground.

In order to effect accurate leveling, it is necessary that the blade shall be adjusted up or down as the implement traverses uneven ground in order to maintain its cutting edge in a straight plane between the points of contact of the end wheels with the ground, and a major object of the present invention is to construct the leveler so that such adjustment of the blade will be effected automatically as the implement traverses the ground.

The present leveler includes a frame arranged intermediate its ends for vertical articulation, and wheels not only at the ends of the frame but intermediate the ends thereof and adjacent the scraping blade, and a further object of this invention is to provide means for automatically relatively raising and lowering the intermediate wheels upon articulation of the frame due to the movement of the same over uneven ground.

As stated, the leveler includes an articulated frame, the articulating movement of which actuates the means for effecting adjustment of the blade, and the frame is also arranged for horizontal articulation to enable the elongated frame to make a relatively sharp turn in a field. A further object of the invention is to arrange the control mechanism for the wheel raising and lowering means, and which mechanism is actuated upon vertical articulation of the frame, so that said mechanism will not be actuated or affected upon horizontal articulation of the frame beyond a predetermined amount of arcuate movement between the frame sections.

The implement also includes an elongated tongue adapted for tractor connection and connected to the leveler frame for relative vertical articulation. A further object is to provide means, functioning upon such articulating movement of the frame and tongue, to cause relative vertical adjustment of the front frame supporting wheels and said frame.

The front wheels are steerable, and a still further object of the invention is to mount these wheels on a separate relatively short frame adapted for direct connection to a tractor, and to mount the longer tongue for detachable connection to the leveler frame and to the wheel-mounting frame so that the wheels may be steered when the tongue is in place, and may also be steered—and the leveler connected to a tractor—when the tongue is removed to shorten the implement for transportation.

It is also an object of the invention to provide a practical, reliable, and durable finish leveler, and yet one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the forward portion of the leveler.

Fig. 1a is a similar view of the rear portion of the leveler.

Fig. 2 is an enlarged fragmentary side elevation, partly in section, of the front end of the leveler, showing the mounting and control means for the front wheels.

Fig. 3 is a fragmentary sectional elevation of the intermediate portion of the leveler, showing the mounting of the intermediate wheels.

Fig. 4 is a fragmentary elevation, partly in section, of the leveler at the hinge and swivel connection between the frame sections, showing the control means for the intermediate wheels.

Fig. 6 is a sectional elevation of the preferred form of hydraulic control valve used.

Figure 5:
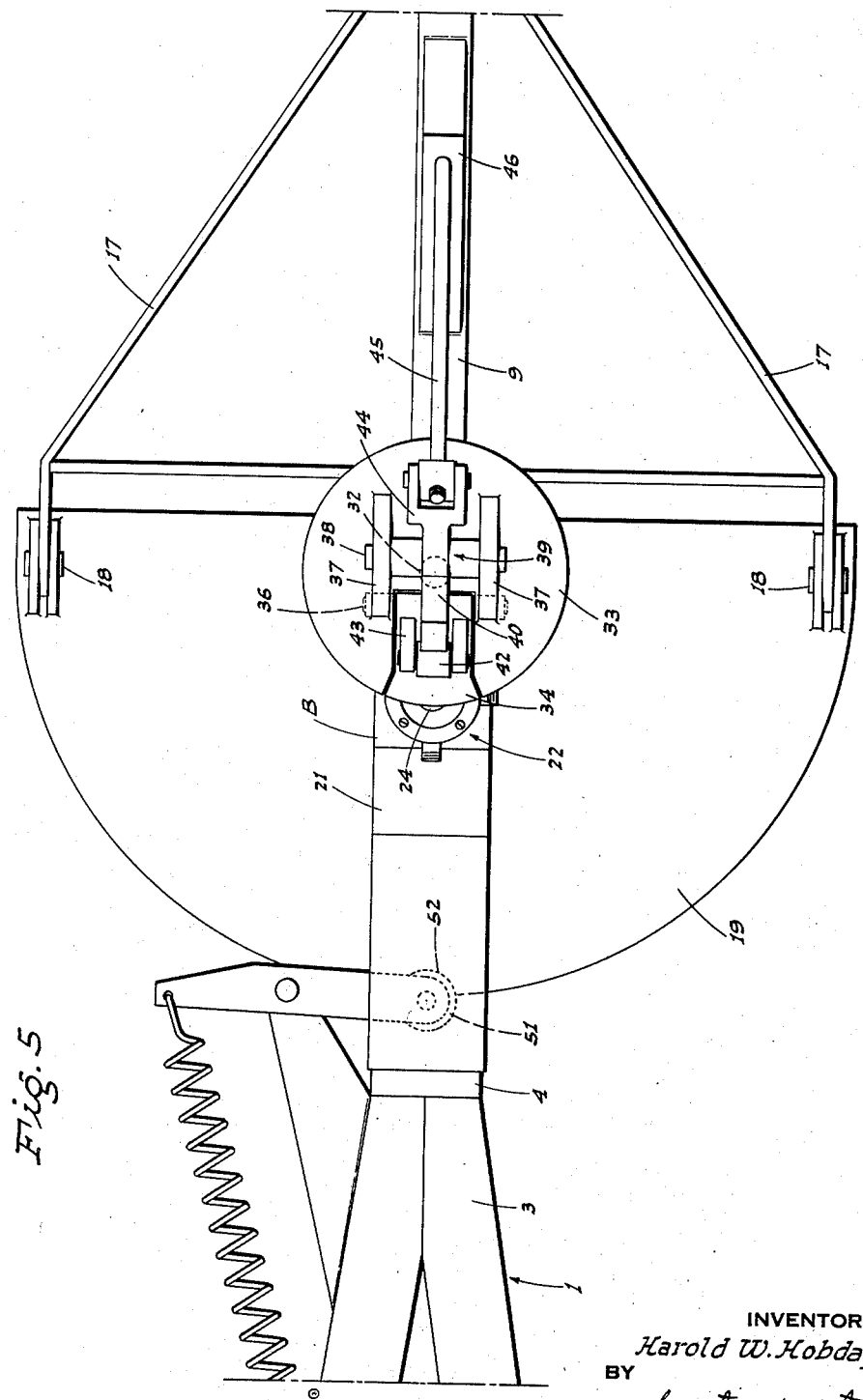
Fig. 5 is a top plan view of the same.

Referring now more particularly to the drawings, and to the characters of reference marked thereon, the leveler generally, as shown in Figs. 1 and 1a, includes an elongated rigid main frame 1, which comprises a forward section 2 preferably of box-beam construction in cross section, and an intermediate section 3. Section 3 is preferably a unit of skeleton construction and of forwardly diverging form, as shown, terminating at its rear end in a rigid, rearwardly opening yoke 4. Sections 2 and 3 are rigid with each other, and together form the main portion of the frame.

A bowl 5 which includes a scraping blade 6 is rigidly secured in connection with the frame 1 at the junction of sections 2 and 3 thereof (see Fig. 3).

Frame 1 is supported, at its forward end, by a pair of wheels 7 in the manner specifically described later, and at a point adjacent but rearwardly of the bowl, by a pair of transversely spaced wheels 8.

Trailing from the yoke 4 and connected thereto for independent vertical and horizontal swivel movement, as will be seen later, and forming the rearmost portion of the frame 1, is a relatively light beam 9, which—at its rear end—supports a gauge or level-controlling caster wheel 10.

Wheels 8 are vertically adjusted, as determined by upward movement of the caster wheel 10, from a position level with the blade 6 and with the normal position of wheels 7 and 8, by the following means:

Wheels 8 are mounted on downwardly and forwardly sloping radial arms 11 fixed on a cross shaft 12 journaled in webs 13 rigid with the adjacent portion of frame unit 3 just rearwardly of the bowl 5. A hydraulic ram 14 is connected between a cross beam 15 on the back of the bowl at the top, and an arm 16 rigid with shaft 12. These parts are arranged so that extension of the ram by fluid pressure lowers the wheels relative to the frame, while the weight of the structure bearing down on the wheels contracts the ram only if the fluid therein is free to escape. A one-way ram is therefore sufficient for the purpose.

The flow to and from the ram is controlled by the following means, as shown particularly in Figs. 4 and 5. The single frame beam 9 is rigidly secured adjacent its forward end with diverging side arms 17 pivoted at their forward end, as at 18, on a horizontal, substantially semicircular and forwardly projecting plate 19. The plate is supported from the yoke 4 by a vertical pin 20 disposed radially of the curvature of the plate; the pivotal axis 18 intersecting the axis of the pin 20. Frame 1 as a whole is thus arranged for vertical articulation. A bracket 21, which overhangs the pin 20 in spaced relation to the upper end thereof, is mounted on top of the yoke 4 and supports a valve unit 22. This unit is mounted on a base B and includes a valve housing 23; said housing having an upstanding plunger or piston valve 24. The valve housing is mounted ahead of the pin 20 some distance, with the axis of the valve intersecting a line radially of the pin 20 and lengthwise of the implement.

A conduit 25 leads to the valve housing from the pump of an engine and pump unit 26 mounted on the frame 1; another conduit 27 leads from the housing to a fluid reservoir 28; while a third conduit 29 connects the ram 14 and the valve housing. The valve 24 is so arranged in connection with the porting in the housing for the various conduits that when the valve is depressed from a neutral position, communication is established between the pump and the ram, extending said ram and relatively lowering the wheels 8. This actually causes the adjacent portion of the frame 1 to raise, so as to raise the blade 6. When the valve 24 lifts, by reason of a spring 30 acting thereon, communication is established between the ram and the reservoir 28, allowing fluid to drain from the ram and the latter to retract, causing a relative raising of the wheels, or an actual lowering of the frame 1 and blade 6.

The valve is thus actuated, by variations in ground level level at the gauge wheel 10 and the wheels 8, by a unit 31 mounted on the yoke 4, and itself controlled by vertical swivel movement of the beam 9, in the following manner:

Mounted on the base B, and upstanding therefrom in axial alinement with pin 20 is a spindle 32 on the upper end of which a disc 33 is secured. This disc includes a segment 34 which normally overhangs and engages a roller 35 on the upper end of valve 24, and which—at its radially inner end—is pivoted on the main portion of the disc transversely of the implement, as at 36, for up and down swivel movement relative to the main portion of the disc and for rotation therewith as a unit.

Mounted on the disc 33 are transversely spaced, upstanding arms 37 which support a cross pin 38 on which a member 39, normally extending lengthwise of the implement, is rockably mounted. The forward portion of member 39 forms a cam 40 having a cam edge 41 engaging a roller 42 mounted on arms 43 upstanding from the valve engaging segment 34.

Edge 41 is arranged to depress the roller 42—and the segment 34—a certain amount only upon downward movement of portion 40 from a neutral position, and regardless of the extent of such movement. Upward movement of portion 40 from said neutral position clears the roller 42 and allows spring 30 to lift the valve 24.

The rear portion of member 39 comprises an arm 44 to which is swivelly connected a depending rod 45 which, adjacent its lower end, is slidable through another bracket 46 fixed on beam 9 adjacent but rearwardly of pivot 18.

A collar 47 on the rod 45 below the upper end of the bracket engages the lower bar 48 of the bracket so that upon relative upward swinging movement of beam 9 about its pivot, the forward portion 40 of member 39 is swung down to depress valve 24.

A spring 49 about the rod 45 between the collar and the upper member of the bracket yieldably presses the collar against the bar 48 so that upon relative downward swinging movement of beam 9 the cam member 40 will be pulled up from the valve and the latter will lift by reason of the action of spring 30 thereon.

Since wheel 10 rides on ground already leveled, in actual operation it is the relative downward or upward movement of the wheels 8, or the front wheels 7, as irregularities in the ground level are encountered, which causes the articulating movement of the main frame portions about the hinge or pivot 18 and actuates the valve control unit in one direction or the other to correspondingly actuate the ram 14.

In connection with unit 31, it will be seen that spindle 32 is turnably supported against axial movement in a bearing sleeve 50, which in turn is mounted on the base B for vertical adjustment relative thereto. This enables the disc 33 to be easily mounted at the necessary level for proper valve engagement and positioning.

The purpose of the horizontal swivel mounting of beam 9 on the vertical pin 20 is to allow said beam, and the wheel 10, to swing relative to the remainder of the frame when the implement is making a turn; such swinging being normally yieldably resisted by a spring-urged roller 51 engaging a notch 52 in the disc 19. When the roller 51 leaves the notch and allows the disc—and the beam 9—to swing horizontally, the unit 31 turns therewith by reason of the connection of the rod 45 therewith, and the fact that spindle 32 is axially alined with the pin 20. For a relatively small amount of arcuate movement of beam 9 and unit 31, the segment 34 remains engaged with roller 42 and the valve is actuated by frame articulation.

When, however, the beam 9 assumes a relatively sharp turn, and when no actuation of ram 14 and adjustment of blade 6 is desired, the segment 34 passes beyond the roller 42 and the latter rides on the solid disc 33, so that no valve movement can then take place regardless of any vertical articulation of the frame 1 which may occur during the time such turn is being made.

Referring now to Fig. 2 particularly, the forward end of the implement is constructed generally as follows:

Frame section 2 at its forward end is formed with a forwardly facing opening 53 across which a vertical removable king pin 54 projects. A draft tongue 55, arranged for connection to a tractor, projects forwardly from the frame 1; the tongue—at its rear end—including a plate 56, narrower vertically than opening 53, which projects into said opening and has a longitudinal slot 57 through which the kingpin passes. The draft tongue is thus mounted for limited horizontal and vertical movement at its rear end, as well as for free turning movement, on the kingpin and relative to the frame.

Wheels 7 are supported from a forwardly projecting truck frame 58, which includes side beams 59 connected at their rear end by a top bar 60 having an upstanding ball 61 engaging the frame section 2 in swivel and supporting relation; the ball 61 being axially alined with the kingpin 54.

The front end of the frame 58—which is relatively short compared to the length of the tongue 55—is connected to the tongue by means of an upstanding yoke 62 on the frame, which is confined between ears 63 depending from the tongue; a cross pin 64 mounted in the ears passing through the yoke opening.

The yoke is arranged relative to the pin and tongue so as to allow of limited longitudinal movement of the tongue without affecting the frame 58, while causing rotation of the tongue about the kingpin 54 to also swing the truck frame 58 so that the wheels 7 will be steered.

Said wheels however are mounted on the frame for up and down movement relative thereto and to the main frame 1 by means of a cross shaft 65, supported from beams 59, and on which shaft rearwardly projecting side ears 66 are fixed which support the spindles (not shown) of wheels 7.

Rotation of shaft 65, which causes such up or down swinging movement of the wheels with relative vertical articulation of the frame 1 and the tongue 55 at the kingpin 54, and a resulting adjustment of the level of the blade 6, is controlled by the following means:

An upstanding arm 67 is secured on the cross shaft 65; a hydraulic one-way ram 68 being connected to said arm and to frame 58 ahead of the arm. A flow of hydraulic fluid to and from the ram and the source of pressure 26 is controlled from a valve unit 69 the same as valve unit 22, and mounted on frame section 2 at its forward end. The valve unit is actuated by a unit 70 which is the same as unit 31 but reversed in position; the axis of the supporting spindle of said unit 70 coinciding with the axis of the kingpin 54, as shown. The bracket 71, which guides and supports the actuating rod 72 of unit 70, however is not fixed on the tongue 55, but on a strip 73 which, at its rear end, engages the tongue in rotating relation, but is slidable on the tongue and yieldably urged toward the kingpin by a spring 74. By reason of this arrangement the tongue may shift back and forth as the limits of the slot 57 will allow, without affecting the position of the actuating rod relative to unit 70 with such shifting movement.

The truck frame 58 is provided, at its forward end, with a clevis 75 for attachment to a tractor, so that the over-all length of the implement may be lessened for transportation thereof along a highway. In such case the elongated tongue is removed by pulling the kingpin 54 and the pin 64; the strip and parts thereon remaining connected with the control unit and being folded over onto the frame 1.

Similarly, for transportation, the rear frame beam 9 and parts attached thereto may be removed by pulling the spindle 20.

From the foregoing description it will be readily seen that there has been produced such a device as will substantially fulfill the objects of the invention, as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful and upon which Letters Patent are desired:

1. A finish leveler comprising an elongated frame which includes a main forward portion and a rear portion, means pivoting the frame portions together for vertical articulation, a scraper rigid with and suspended from the forward frame portions rearwardly of its forward end, wheels supporting the frame adjacent its ends, means including a power device mounted on the frame to raise and lower the frame adjacent the scraper, and including a hydraulic ram, a fluid-pressure supply system mounted on the frame and connected to the ram, a control valve included in the system and mounted on the forward frame portion at its rear end, said valve including an upstanding piston and spring means urging the piston upwardly, a rockable member extending lengthwise of the leveler pivoted intermediate its ends in connection with the valve above the same, a rod mounted on the rear frame portion and connected to the rear end of the rockable member whereby to rock the same upon articulating movement of the frame in a downward direction at the pivot means, and means between the member and the valve piston to depress the latter against the resistance of the spring upon upward movement of the rod; and conduit means between the ram and valve arranged so that such depression of the piston will supply pressure to the ram to actuate the same in a direction to effect a compensating articulation of the frame at the scraper while upward movement of the piston by spring action relieves the pressure from the ram.

2. A leveler, as in claim 1, with vertical pivot means mounting the rear frame portion on the front frame portion for rotation in a horizontal plane in addition to its articulation in a vertical plane; the last named means including an element mounted on the leveler for rotation about a vertical axis alined with the vertical pivot means of said frame portion and overhanging the valve piston and on which the rockable member and the piston depressing means are mounted; the rod being arranged so as to impart rotation to the element as the frame portions rotate relative to each other.

3. A structure, as in claim 2, in which said element comprises a disc, and the piston depressing means comprises a segment of the disc forming a part of the disc normally level therewith and hinged transversely of the leveler thereon; the segment being engaged by the rockable member and engaging the valve piston during a relatively small arcuate movement of the element.

4. A finish leveler comprising an elongated frame including a main forward portion and a rear portion, means pivotally connecting the frame portions for vertical and horizontal articulation, a scraper supported from the front frame portion rearwardly of its forward end, wheels supporting the frame at its ends, intermediate wheels supporting the frame adjacent the scraper, a power device mounted on the frame and operatively connected to said intermediate wheels to relatively raise and lower the last named wheels whereby to raise and lower the frame adjacent the scraper, means mounted on the frame to actuate said device upon vertical articulating movement of the frame, and means included with said last named means to prevent such actuation upon relative horizontal articulation of the frame portions beyond a predetermined arcuate limit.

5. A leveler, as in claim 4, with means between the frame portions yieldably preventing such horizontal articulation of the frame portions without affecting vertical articulation thereof.

6. A finish leveler comprising an elongated frame, a tongue projecting forwardly from the frame for connection to a tractor and arranged with the frame for vertical articulation, a scraper supported from the frame rearwardly of its forward end, front and rear wheels supporting the frame at its forward end and adjacent the scraper respectively, a power device mounted on the leveler and operatively connected to the front wheels to raise and lower the front wheels relative to the frame, and means functioning upon articulating movement of the tongue and frame to actuate said power device.

7. A finish leveler comprising an elongated frame which includes a main forward portion and a rear portion, means pivoting the frame portions together for vertical articulation, a scraper rigid with and suspended from the forward frame portion rearwardly of its forward end, wheels supporting the frame adjacent its ends, intermediate frame-supporting wheels adjacent the scraper, a power device connected between the frame and said last named wheels to relatively raise and lower said wheels whereby to raise and lower the frame adjacent the scraper, means mounted on the frame to actuate the power device upon articulation of the frame, a tongue projecting forwardly from the frame for connection to a tractor and arranged for vertical articulation with the forward portion of the frame, a power device to relatively raise and lower said front wheels, and means connected between the tongue and said forward frame portion to actuate said last named power device upon relative articulating movement of said frame portion and the tongue.

8. A finish leveler comprising an elongated frame including a main forward portion and a rear portion, means pivotally connecting the frame portions for vertical and horizontal articulation, a scraper supported from the front frame portion rearwardly of its forward end, wheels supporting the frame at its ends, intermediate wheels supporting the frame adjacent the scraper, a power device on the leveler to relatively raise and lower the scraper, control means for said device mounted on the forward frame portion and including a depressible element whose depression places the power device in operation, a depressible member overlying and engaging the element, means mounting said member on the forward frame portion for rotation about a vertical axis alined with the vertical pivot means of the frame portions, and means connected between the member and the rear frame portion to depress said member upon vertical articulation of the frame portions and to rotate the member upon horizontal articulation of said frame portions.

9. A finish leveler comprising an elongated frame including a main forward portion and a rear portion, means pivotally connecting the frame portions for vertical and horizontal articulation, a scraper supported from the front frame portion rearwardly of its forward end, wheels supporting the frame at its ends, intermediate wheels supporting the frame adjacent the scraper, a power device on the leveler to relatively raise and lower the scraper, control means for said device mounted on the leveler, and actuating means for said control member mounted on the leveler and functioning upon vertical articulation of the frame portions irrespective of an accompanying horizontal articulation of said frame portions within predetermined limits.

10. A finish leveler comprising an elongated frame including a main forward portion and a rear portion, means pivotally connecting the frame portions for vertical and horizontal articulation, a scraper supported from the front frame portion rearwardly of its forward end, wheels supporting the frame at its ends, intermediate wheels supporting the frame adjacent the scraper, a power device on the leveler to relatively raise and lower the scraper, control means for said device mounted on the forward frame portion and including a depressible element whose depression places the power device in operation, actuating means to depress said element connected between the rear frame portion and the element, and means mounting the actuating means on the leveler for rotation of said actuating means about a vertical axis coincident with that of the frame portions.

11. A finish leveler comprising an elongated frame including a main forward portion and a rear portion, means pivotally connecting the frame portions for vertical and horizontal articulation, a scraper supported from the front frame portion rearwardly of its forward end, wheels supporting the frame at its ends, intermediate wheels supporting the frame adjacent the scraper, a power device on the leveler to relatively raise and lower the scraper, control means for said device mounted on the forward frame portion and including a depressible element whose depression places the power device in operation, a disc overlying the element and having a segmental portion normally engaging said element and mounted on the disc for depression relative thereto and for rotation as a unit therewith, means mounting the disc on the forward frame portion for rotation about a vertical axis alined with the vertical pivot means on the frame portions, and means connected between the segmental portion and the rear frame portion to depress said segmental portion upon vertical articulation of the frame portions and to rotate said segmental portion, together with the disc, upon horizontal articulation of said frame portions.

References Cited in the file of this patent

UNITED STATES PATENTS

| | | |
|---|---|---|
| 2,309,204 | Nelson | Jan. 26, 1943 |
| 2,314,888 | Manning | Mar. 30, 1943 |
| 2,502,217 | Guibor | Mar. 28, 1950 |
| 2,503,638 | Shuey | Apr. 11, 1950 |
| 2,568,261 | Stade | Sept. 18, 1951 |
| 2,659,166 | Mathias | Nov. 17, 1953 |
| 2,720,716 | White | Oct. 18, 1955 |
| 2,732,640 | Kirchner | Jan. 31, 1956 |